United States Patent
Dai et al.

(10) Patent No.: US 10,560,997 B2
(45) Date of Patent: Feb. 11, 2020

(54) METHOD FOR MR16 LAMP TO PASS EMI TEST WITH CCG

(71) Applicant: LEDVANCE GmbH, Garching bei Munchen (DE)

(72) Inventors: Yongchang Dai, Guangdong (CN);
Xiaoming Fu, Guangdong (CN);
Xiangyin Hao, Guangdong (CN); Kun Xiong, Guangdong (CN)

(73) Assignee: LEDVANCE GMBH, Garching Bei Munich (DE)

( * ) Notice: Subject to any disclaimer, the term of this patent is extended or adjusted under 35 U.S.C. 154(b) by 0 days.

(21) Appl. No.: 16/127,983

(22) Filed: Sep. 11, 2018

(65) Prior Publication Data
US 2019/0098726 A1    Mar. 28, 2019

(30) Foreign Application Priority Data

Sep. 27, 2017  (CN) .......................... 2017 1 0889280

(51) Int. Cl.
*H05B 33/08* (2006.01)
*H05B 37/02* (2006.01)

(52) U.S. Cl.
CPC ..... *H05B 33/0887* (2013.01); *H05B 33/0815* (2013.01)

(58) Field of Classification Search
CPC ................ H05B 33/08; H05B 33/0809; H05B 33/0815; H05B 33/0887; H05B 37/02; H05B 41/28; H05B 41/2813; H05B 41/285; H05B 41/292
See application file for complete search history.

(56) References Cited

U.S. PATENT DOCUMENTS

| | | | | |
|---|---|---|---|---|
| 5,661,645 | A * | 8/1997 | Hochstein | ............... H02J 9/065 363/89 |
| 8,680,784 | B2 * | 3/2014 | Hariharan | .......... H05B 33/0815 315/201 |
| 8,686,659 | B2 * | 4/2014 | Kumar | ............... H05B 37/0209 315/201 |
| 2006/0002155 | A1 * | 1/2006 | Shteynberg | .......... H02M 1/4258 363/21.12 |
| 2011/0248640 | A1 * | 10/2011 | Welten | ............... H05B 33/0815 315/210 |

* cited by examiner

*Primary Examiner* — Thai Pham
(74) *Attorney, Agent, or Firm* — Hayes Soloway PC

(57) ABSTRACT

A lamp driver for an LED lamp includes a voltage input port which is adapted to connect the lamp driver to a power source. A boost converter circuit is connected to the voltage input port. A voltage output port is adapted for connecting an LED to the lamp driver. A shutdown circuit provides a shutdown signal, which is connected to the voltage input port for detecting an input voltage of the voltage input port and is connected to the boost converter circuit for controlling at least one active component of the boost converter. The shutdown circuit is arranged to shut down the boost converter circuit when a shutdown voltage at the voltage input port is detected. During the shutdown of the boost converter circuit, the voltage output port still provides an operation voltage for the LED.

20 Claims, 3 Drawing Sheets

METHOD FOR MR16 LAMP TO PASS EMI TEST WITH CCG

CROSS-REFERENCE

This patent application claims the benefit of and priority to Chinese Patent Application No. 201710889280X filed on Sep. 27, 2017, the entire disclosure of which is incorporated herein by reference.

TECHNICAL FIELD

The present invention relates to a lamp driver for an LED lamp and an LED lamp comprising such a lamp driver.

BACKGROUND

LED lamps are commonly known and widespread lightning devices as efficient alternatives for incandescent bulbs.

However, currently available LED lamp drivers do either pass the electromagnetic interference (EMI) test for conventional control gear (CCG) or for electronic control gear (ECG). Hence, the operating range of currently available LED lamp drivers is limited.

To overcome this issue, in particular when the LED lamp is connected with a CCG, capacitors of big values can be used, leading to capacitors of big size and higher cost in general. This is, however, adverse in LED technology. Regarding ECG, they need a resistance load and if, the driver has a big input capacitor, this is, however, not compatible with ECG.

Thus, currently available LED lamp drivers, in particular MR 16 lamps, can either work properly with conventional control gear (CCG) or electronic control gear (ECG).

SUMMARY OF THE INVENTION

In view of the afore-described disadvantages of currently known LED lamps, it is an object of the present invention to provide a lamp driver for an LED lamp that is capable for CCG as well as ECG. A further object of the present invention is to provide an LED lamp for operation with CCG and ECG.

This object is solved by a lamp driver and an LED lamp according to the independent claims. Preferred embodiments are given by the dependent claims, the description, and the drawings.

Accordingly, a lamp driver for an LED lamp is provided. The lamp driver comprises a voltage input port which is adapted to connect the lamp driver to a power source, a boost converter circuit which is connected to the voltage input port, a voltage output port which is adapted for connecting an LED to the lamp driver, and a shutdown circuit for providing a shutdown signal which is connected to the voltage input port for detecting an input voltage of the voltage input port and which is connected to the boost converter circuit for controlling at least one active component of the boost converter, wherein the shutdown circuit is arranged to shut down the boost converter circuit when a shutdown voltage at the voltage input port is detected, and wherein during the shutdown of the boost converter circuit, the voltage output port still provides an operation voltage for the LED.

The voltage input port of the lamp driver is adapted to connect the lamp driver to a power source, in particular via a CCG or an ECG. Preferably, the power source itself is a socket.

Furthermore, the voltage input port is connected to the boost converter circuit providing a voltage at the voltage output port. Hence, the boost converter circuit provides a voltage at the voltage output port, preferably via a buck converter.

The shutdown circuit of the lamp driver comprises two connections, one for detecting an input voltage at the voltage input port of the lamp driver and one for controlling the boost converter, in particular the active component of the boost converter. Thus, the boost converter is controlled by the shutdown circuit due to the voltage at the voltage input.

The shutdown circuit, itself, is arranged to shut down the boost converter circuit, whenever a shutdown voltage at the voltage input port occurs. Therefore, a shutdown signal can be used, e.g., for shutting down the active component of the boost converter so that the boost converter goes inactive on the shutdown signal.

The boost converter, itself, may comprise a normal boost converter structure, e.g., at least one transistor, having the function to boost voltage.

Moreover, the boost converter is so designed that during shutdown, an operation voltage at the voltage output port is still provided. Hence, the boost converter comprises at least one branch which is active, even during shutdown due to a shutdown signal of the shutdown circuit. For example, the boost converter is a two-port network comprising an upper branch and a lower branch, wherein the upper branch and the lower branch are connectable via a transistor. In this case, the boost converter has two functions, depending on the state of the transistor. If the transistor is on, the boost converter is on, and if the transistor is off, the boost converter is off or shut down.

Hence, the proposed arrangement enables two states, a first state, wherein the lamp driver is able to work properly with CCG, and a second state, wherein the lamp driver is able to work properly with ECG. In particular, the proposed lamp driver will pass the EMI test with a CCG as well as an ECG. Moreover, no capacities of big values are needed. Hence, a small and inexpensive lamp driver is provided, solving the above-mentioned technical problems.

In a preferred embodiment, a second converter may be used to control the LED current. The second converter may be arranged between the boost converter and the LED in order to provide a constant LED current. The second converter may be a buck converter or any other topology converter, which is able to provide a constant LED current.

According to at least one embodiment of the lamp driver, the boost converter circuit comprises at least one transistor which is controlled by the shutdown circuit via the shutdown signal and which is arranged to shut down the boost converter circuit.

The boost converter may also comprise a plurality of transistors controlled by the shutdown circuit, e.g., by one shutdown signal or by a plurality of different shutdown signals. The transistor or the transistors, however, are arranged for shutting down the boost converter, in particular the boost function of the boost converter.

According to at least one embodiment of the lamp driver, the boost converter circuit comprises at least one inductor which is live during shutdown in order to provide the operation voltage for the LED.

For example, the boost converter is a two-port network comprising an upper branch and a lower branch, wherein the upper branch and the lower branch are connectable via a transistor. In this case, the inductor is preferably arranged in the upper branch, which is live during normal operation and during shutdown. Hence, the upper branch comprising the inductor is live independent of the state of the transistor connecting the upper and the lower branch. Therefore, the inductor is live even during shutdown of the boost converter. Thus, the inductor is live during both states of the transistor of the boost converter.

Hence, a double use of an inductor is proposed, in particular to overcome the above-mentioned technical problems.

According to at least one embodiment of the lamp driver, the lamp driver further comprises a buck converter circuit which is connected to the boost converter and which is connected to the voltage output port.

Preferably, the buck converter circuit is arranged in series and between the boost converter circuit and the voltage output port. Therefore, the buck converter circuit is always live independent of the state of the transistor of the boost converter circuit or the state of the boost converter itself due to the fact that the boost converter comprises one branch which is always live.

Hence, the lamp driver comprises at least one boost converter circuit and one buck converter circuit, wherein the buck converter circuit is connected behind the boost converter circuit and wherein the boost converter is controllable via the shutdown circuit, having an on state and an off state, wherein the buck converter is live during the off state of the boost converter circuit and is live during the on state of the converter circuit.

According to at least one embodiment of the lamp driver, the buck converter circuit comprises at least one capacitor, and during shutdown of the boost converter circuit, the at least one capacitor and the at least one inductor of the boost converter circuit which is live during shutdown form an LC electromagnetic interference filter.

Hence, during shutdown of the boost converter circuit, one part, in particular the inductor, of the boost converter circuit and one part, in particular the capacitor, of the boost converter circuit form an LC circuit, in particular an LC electromagnetic interference filter.

Hence, the inductor of the boost converter circuit and the capacitor of the buck converter circuit are arranged and designed to form an LC filter, during shutdown of the boost converter circuit, in particular for connecting the lamp driver to ECG and CCG.

According to at least one embodiment of the lamp driver, the shutdown circuit further comprises a detecting circuit for detecting the input voltage of the voltage input port.

Preferably, the detecting circuit is arranged to detect a voltage at the voltage input port, e.g., by comprising a measuring circuit.

According to at least one embodiment of the lamp driver, the shutdown circuit further comprises a control circuit for providing the shutdown signal in order to shut down the boost converter circuit.

Therefore, the control circuit receives a voltage signal of the input voltage by the detecting circuit and compares this voltage value with a predetermined set point value and if the received voltage value exceeds the predetermined set point value, a shutdown signal is provided in order to shut down the boost converter circuit, in particular by turning off the active component of the boost converter circuit, in particular the transistor of the boost converter circuit, which is controlled by the shutdown circuit.

Further, an LED lamp is provided. The LED lamp comprises a lamp driver as described above and at least one LED connected to the voltage output port of the lamp driver. That is to say, all features that are disclosed for the lamp driver also are disclosed for the LED lamp and vice versa.

Thus, the LED is operable with CCG and ECG.

Furthermore, a method for controlling an LED lamp comprising at least one boost converter circuit is provided. The method comprises the steps of: detecting an input voltage of the LED lamp; comparing the detected input voltage with a predetermined set point voltage; and shutting down the boost converter circuit due to the comparison of the detected input voltage with the predetermined set point value so that at least one component of the boost converter circuit is still live.

BRIEF DESCRIPTION OF THE DRAWINGS

Preferred embodiments of the invention will be explained in the following, having regard to the drawings.

DETAILED DESCRIPTION OF THE INVENTION

Figure 1A:
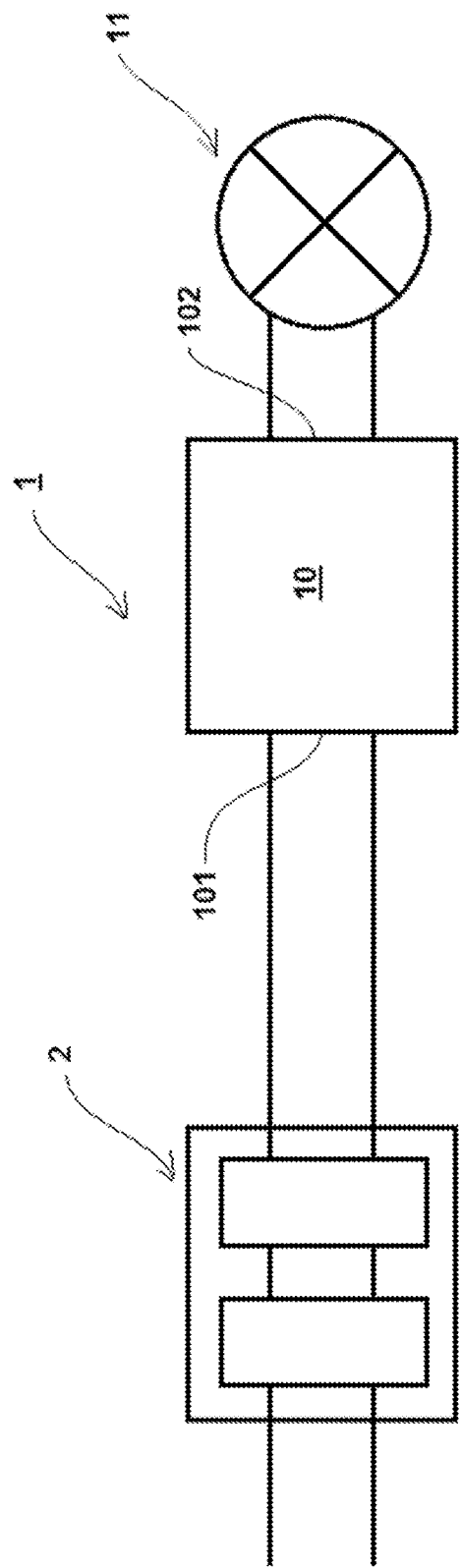
FIG. 1A shows an exemplary embodiment of the lamp driver connected to an ECG and an LED.

In the following, preferred embodiments of the invention will be described with reference to the drawings. Here, elements that are identical, similar, or have an identical or similar effect are provided with the same reference numerals in the figures. Repeating the description of such elements may be omitted in order to prevent redundant descriptions.

The figures and the size relationships of the elements illustrated in the figures among one another should not be regarded as being to scale. Rather, individual elements may be illustrated with an exaggerated size to enable better illustration and/or better understanding.

FIG. 1A shows exemplary the typical structure of an embodiment of a lamp driver connected to an ECG, in particular a lamp driver 10 of an LED lamp 1.

The ECG 2 is connected to the lamp driver 10 which is connected to at least one LED 11.

The ECG 2 may be connected to a power source, e.g., a socket (now shown). Furthermore, the ECG 2 comprises an EMI filter and an electromagnetic circuit in order to pass the EMI test of the LED lamp.

The lamp driver 10 is connected to the ECG 2 via the voltage input port 101 and is connected to the LED 11 via the voltage output port 102.

The LED 11 is at least one LED or a plurality of LEDs.

Figure 1B:
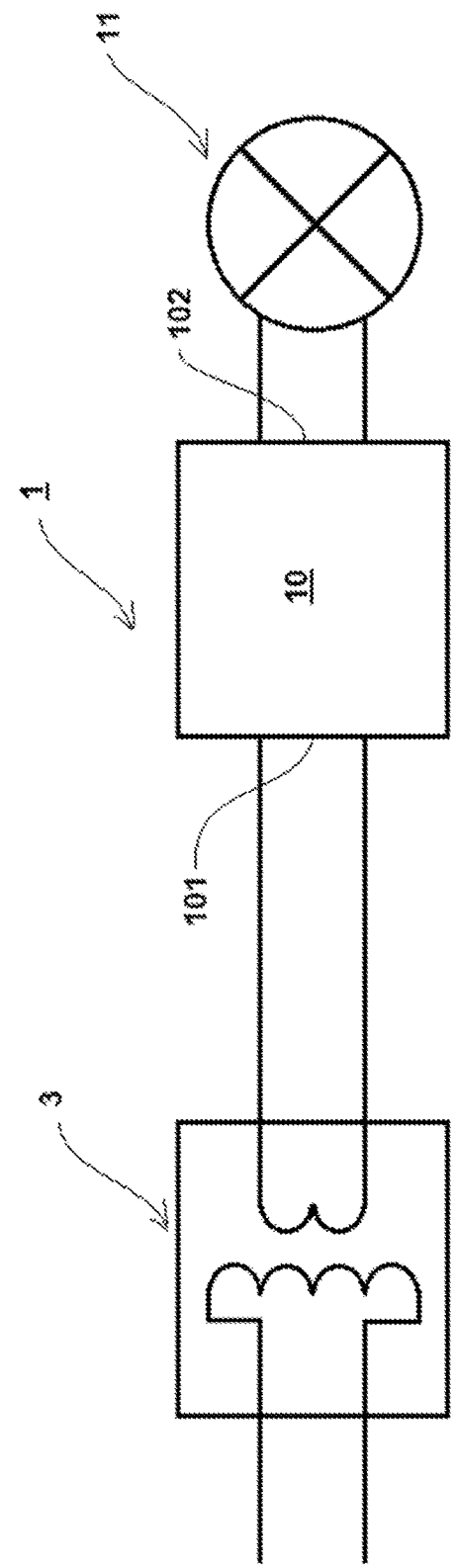
FIG. 1B shows an exemplary embodiment of the lamp driver connected to a CCG and an LED.

FIG. 1B shows exemplary the typical structure of an embodiment of a lamp driver connected to a CCG, in particular a lamp driver 10 of an LED lamp 1.

The CCG 3 is connected to the lamp driver 10 which is connected to at least one LED 11.

The CCG 3 may be connected to power, e.g., a socket (not shown). Furthermore, the CCG 3 comprises a transformer in order to pass the EMI test of the LED lamp.

The lamp driver 10 is connected to the ECG 2 via the voltage input port 101 and is connected to the LED 11 via the voltage output port 102.

Referring to FIG. 1A as well as FIG. 1B and the background of the invention, currently available lamp drivers do either pass the electromagnetic interference (EMI) test for conventional control gear (CCG) or for electronic control gear (ECG).

Figure 2:
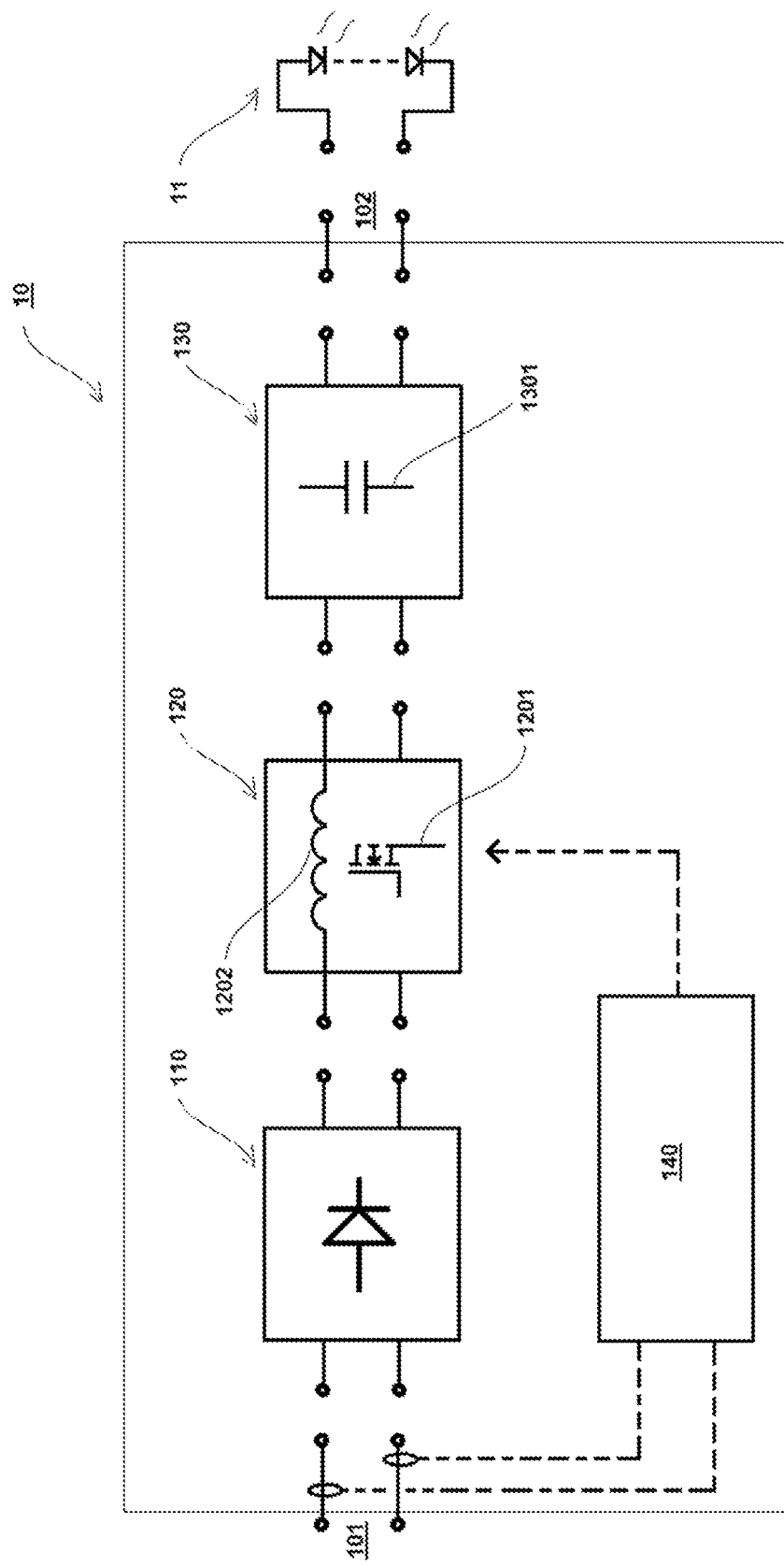
FIG. 2 shows an exemplary embodiment of a lamp driver 10.

FIG. 2 shows an exemplary embodiment of a lamp driver 10 which is connected to a plurality of LEDs 11.

The lamp driver 10 comprises a voltage input port 101 which is adapted to connect the lamp driver 10 to a power source. The power source may comprise the ECG or the CCG, or the ECG or the CCG may be part of a lamp comprising such a lamp driver 10.

The lamp driver 10 further comprises a diode bridge 110 which is adapted to provide an operation voltage to the boost converter circuit 120.

The boost converter circuit 120 comprises at least one transistor 1201 which is controlled by the shutdown circuit 140 via the shutdown signal and which is arranged to shut down the boost converter circuit 120. Preferably, the transistor 1201 is a MOSFET. Moreover, the boost converter circuit 120 comprises at least one inductor 1202 which is live during shutdown of the boost converter circuit 120.

The lamp driver 10 further comprises a buck converter circuit 130 which is connected to the boost converter circuit 120 and which is connected to the voltage output port 102.

The buck converter circuit 130 comprises at least one capacitor 1301 and during shutdown of the boost converter circuit 120, the at least one capacitor 1301 and the at least one inductor 1202 of the boost converter circuit 120 which is live during shutdown form an LC electromagnetic interference filter.

Furthermore, the lamp driver 10 comprises a shutdown circuit 140.

The shutdown circuit 140 is arranged to detect an input voltage at the voltage input port 101 and arranged for providing a shutdown signal to the at least one transistor 1201 of the boost converter circuit 120 in order to shut down the boost converter circuit 120 due to a shutdown voltage at the voltage input port 101. Hence, the shutdown circuit 140 is arranged to control the at least one active component of the boost converter circuit 120. In particular, the shutdown circuit 140 is arranged to shut down the boost converter circuit 120 when a shutdown voltage at the voltage input port 101 is detected, wherein during the shutdown of the boost converter circuit 120, the voltage output port 102 still provides an operation voltage for the LED 11.

In particular, the boost converter circuit 120 is used to get a good ECG compatibility and/or the boost stage of the boost converter circuit 120 can be shut down without affecting the buck converter circuit 130.

Hence, a double use of an inductor 1202 is proposed and, thus, FIG. 2 shows a lamp driver 10 having two states: a first state, wherein the lamp driver 10 is able to work properly with CCG; and a second state, wherein the lamp driver is able to work properly with ECG. In particular, the proposed lamp driver 10 will pass the EMI test with a CCG as well as with an ECG. Moreover, no capacities of big values are needed. Hence, a small and inexpensive lamp driver is provided, solving the above-mentioned technical problems.

Figure 3:
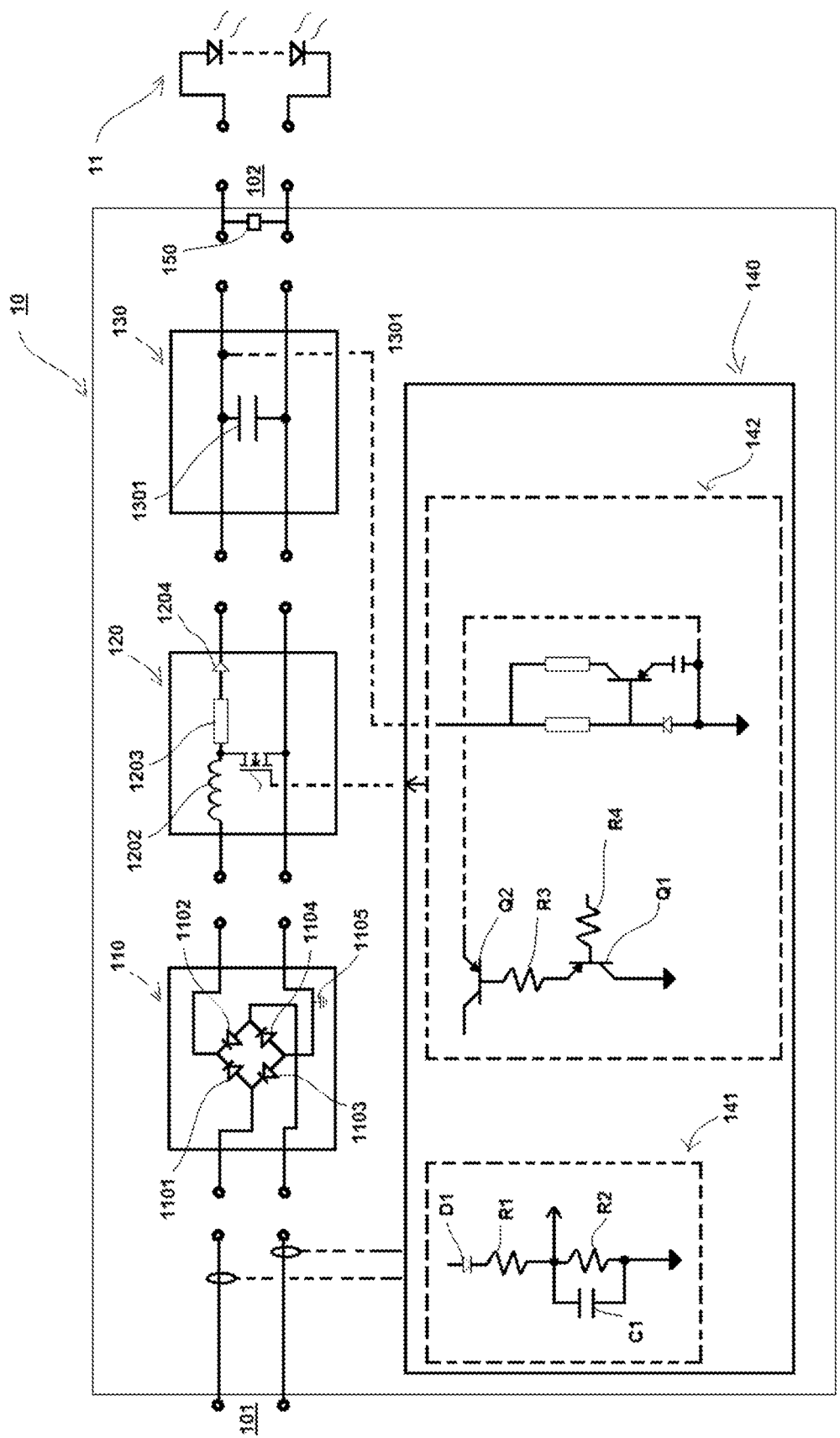
FIG. 3 shows another exemplary embodiment of the lamp driver 10.

FIG. 3 shows another exemplary embodiment of a lamp driver 10 which is connected to a plurality of LEDs 11.

The lamp driver 10 comprises a voltage input port 101 which is adapted to connect the lamp driver 10 to a power source. The power source may comprise the ECG or the CCG, or the ECG or the CCG may be part of the lamp comprising such a lamp driver 10.

The lamp driver 10 further comprises a diode bridge 110 having a first, a second, a third, and a fourth diode 1101, 1102, 1103, and 1104 (respectively), which are arranged to provide an operation voltage to the boost converter circuit 120. In addition, the diode bridge 110 is grounded via ground 1105.

The boost converter circuit 120 comprises at least one transistor 1201 which is controlled by the shutdown circuit 140 via the shutdown signal and which is arranged to shut down the boost converter circuit 120. Moreover, the boost converter circuit 120 comprises at least one inductor 1202, one resistance 1203, and one diode 1204, which are live during shutdown of the boost converter circuit 120.

The lamp driver 10 further comprises a buck converter circuit 130 which is connected to the boost converter circuit 120 and which is connected to the voltage output port 102. The buck converter circuit 130 comprises at least one capacitor 1301, and during shutdown of the boost converter circuit, the at least one capacitor 1301 and the at least one inductor 1202 of the boost converter circuit 120 which is live during shutdown form an LC electromagnetic interference filter.

Furthermore, the lamp driver 10 comprises a shutdown circuit 140.

The shutdown circuit 140 comprises a detect circuit 141 in order to detect an input voltage at the voltage input port 101 and a control circuit 142 for providing a shutdown signal to the transistor 1201 of the boost converter circuit 120 in order to shut down the boost converter circuit 120 due to a shutdown voltage at the voltage input port 101.

The detect circuit 141 comprises a diode D1, a resistance R1, another resistance R2, and a capacitor C1. The diode D1 is connected in series with the resistance R1 which is connected in series with the resistance R2 and the capacitor C2, which are parallel connected.

The control circuit 142 comprises a transistor Q1, another transistor Q2, a resistance R3, and another resistance R4. The resistance R3 is connected to the base of the transistor Q1 and to the collector of the transistor Q2, wherein the resistance R4 is connected to the base of the transistor Q2. Hence, the transistor Q2 works as a switch. In particular, when the detect circuit 141 detects that the lamp driver 10 is connected to an ECG via the input voltage at the input port 101 of the lamp driver 10, the transistors Q1 and Q2 turn on and the boost converter circuit 120 is on. When the detect circuit 141 detects that the lamp driver 10 is connected to a CCG via the input voltage and the input port 101 of the lamp driver 10, the transistors Q1 and Q2 turn off and the boost converter circuit 120 is off or in shutdown.

Whenever the boost converter circuit 120 is off, the inductor 1202 is live but the boost converter circuit 120 does not boost the input voltage.

As a result, the lamp driver 10 will pass the EMI with ECG as well as with CCG. Moreover, the provided lamp driver 10 does not affect the performance of the lamp or the LEDs 11. In addition, no other EMI components are needed, so the cost of the provided lamp driver 10 is low in comparison.

Hence, the shutdown circuit 140 is arranged to control the at least one active component of the boost converter circuit 120. In particular, the shutdown circuit 140 is arranged to shut down the boost converter circuit 120 when a shutdown voltage at the voltage input port 101 is detected, wherein during the shutdown of the boost converter circuit 120, the voltage output port 102 still provides an operation voltage for the LED 11.

Preferably, the lamp driver 10 comprises a controller 150 which is arranged at the voltage output port 102, in order to control the voltage provided by the buck converter circuit 130.

LIST OF REFERENCE NUMERALS

1 LED lamp
2 electronic control gear (ECG)

3 conventional control gear (CCG)
10 lamp driver
101 voltage input port
102 voltage output port
110 diode bridge
1101 first diode of diode bridge
1102 second diode of diode bridge
1103 third diode of diode bridge
1104 fourth diode of diode bridge
1105 ground
120 boost converter circuit
1201 transistor of boost converter circuit
1202 inductor of boost converter circuit
1203 resistance of boost converter circuit
1204 diode of boost converter circuit
130 buck converter circuit
1301 capacitor of buck converter circuit
140 shutdown circuit
141 detect circuit of shutdown circuit
142 control circuit of shutdown circuit
150 controller of lamp driver
11 plurality of LEDs
C1 capacitor of detect circuit
D1 diode of detect circuit
R1 first resistance of detect circuit
R2 second resistance of detect circuit
R3 first resistance of control circuit
R4 second resistance of control circuit
Q1 first transistor of control circuit
Q2 second transistor of control circuit

The invention claimed is:

1. A lamp driver for a light-emitting diode (LED) lamp, the lamp driver comprising:
a voltage input port configured to connect the lamp driver to a power source;
a boost converter circuit connected to the voltage input port;
a voltage output port configured to connect an LED to the lamp driver; and
a shutdown circuit connected to the voltage input port for detecting an input voltage of the voltage input port and connected to the boost converter circuit for controlling at least one active component of the boost converter circuit, wherein the shutdown circuit is arranged to shut down the boost converter circuit with a shutdown signal when the input voltage at the voltage input port is detected as exceeding a predetermined set point voltage value;
wherein the lamp driver is configured such that during the shutdown of the boost converter circuit, the voltage output port still provides an operation voltage for the LED.

2. The lamp driver according to claim 1, wherein the boost converter circuit comprises at least one of:
at least one transistor configured to be controlled by the shutdown circuit via the shutdown signal and arranged to shut down the boost converter circuit; and
at least one inductor configured to be live during the shutdown in order to provide the operation voltage for the LED.

3. The lamp driver according to claim 1, wherein the boost converter circuit comprises:
at least one transistor configured to be controlled by the shutdown circuit via the shutdown signal and arranged to shut down the boost converter circuit; and
at least one inductor configured to be live during the shutdown in order to provide the operation voltage for the LED.

4. The lamp driver according to claim 1, further comprising a buck converter circuit connected to the boost converter circuit and connected to the voltage output port.

5. The lamp driver according to claim 4, wherein:
the buck converter circuit comprises at least one capacitor;
the boost converter circuit comprises at least one inductor; and
the lamp driver is configured such that during the shutdown of the boost converter circuit, the at least one capacitor of the buck converter circuit and the at least one inductor of the boost converter circuit are live, forming an LC electromagnetic interference filter.

6. The lamp driver of claim 4, wherein:
the boost converter circuit comprises at least one inductor which is live during the shutdown in order to provide the operation voltage for the LED;
the buck converter circuit comprises at least one capacitor; and
the lamp driver is configured such that during the shutdown of the boost converter circuit, the at least one capacitor of the buck converter circuit and the at least one inductor of the boost converter circuit are live, forming an LC electromagnetic interference filter.

7. The lamp driver of claim 4, wherein the buck converter circuit is connected to the boost converter circuit downstream of the boost converter circuit.

8. The lamp driver according to claim 4, wherein the buck converter circuit is arranged in series and between the boost converter circuit and the voltage output port.

9. The lamp driver according to claim 4, wherein the buck converter circuit is configured to remain live independent of at least one of:
a state of a transistor of the boost converter circuit; and
a state of the boost converter circuit.

10. The lamp driver according to claim 4, wherein the buck converter circuit is connected behind the boost converter circuit, and wherein the buck converter circuit is configured to be live during both an off state of the boost converter circuit and an on state of the boost converter circuit.

11. The lamp driver according to claim 1, wherein the shutdown circuit further comprises at least one of:
a detecting circuit connected to the voltage input port for detecting the input voltage of the voltage input port; and
a control circuit for providing the shutdown signal in order to shut down the boost converter circuit.

12. The lamp driver according to claim 1, wherein the shutdown circuit further comprises:
a detecting circuit connected to the voltage input port for detecting the input voltage of the voltage input port; and
a control circuit for providing the shutdown signal in order to shut down the boost converter circuit.

13. A lamp comprising:
at least one lamp driver according to claim 1; and
at least one LED connected to the voltage output port of the at least one lamp driver.

14. The lamp driver of claim 1, wherein the boost converter circuit is configured as a true boost converter circuit in that it is not configured, in part or in whole, as a buck converter circuit.

15. The lamp driver of claim 1, wherein the boost converter circuit comprises:
   at least one transistor; and
   at least one inductor configured to be live during the shutdown of the boost converter circuit.

16. The lamp driver of claim 1, wherein the lamp driver is configured such that the LED, when connected to the lamp driver, is operable regardless of whether the power source is a convention control gear (CCG)-type power source or an electronic control gear (ECG)-type power source.

17. The lamp driver of claim 1, wherein the lamp driver is configured such that it has:
   a first state of operation in which the lamp driver is compatible for operation with a convention control gear (CCG)-type power source; and
   a second state of operation in which the lamp driver is compatible for operation with an electronic control gear (ECG)-type power source.

18. The lamp driver of claim 1, wherein the boost converter circuit comprises at least one transistor, and wherein the at least one active component of the boost converter circuit comprises the at least one transistor.

19. The lamp driver of claim 1, wherein the boost converter circuit comprises a first branch and a second branch, wherein:
   the first branch is active during the shutdown of the boost converter circuit; and
   the first branch and the second branch are configured to be connected by at least one transistor.

20. The lamp driver of claim 19, wherein the first branch comprises at least one inductor.

* * * * *